Patented Oct. 20, 1925.

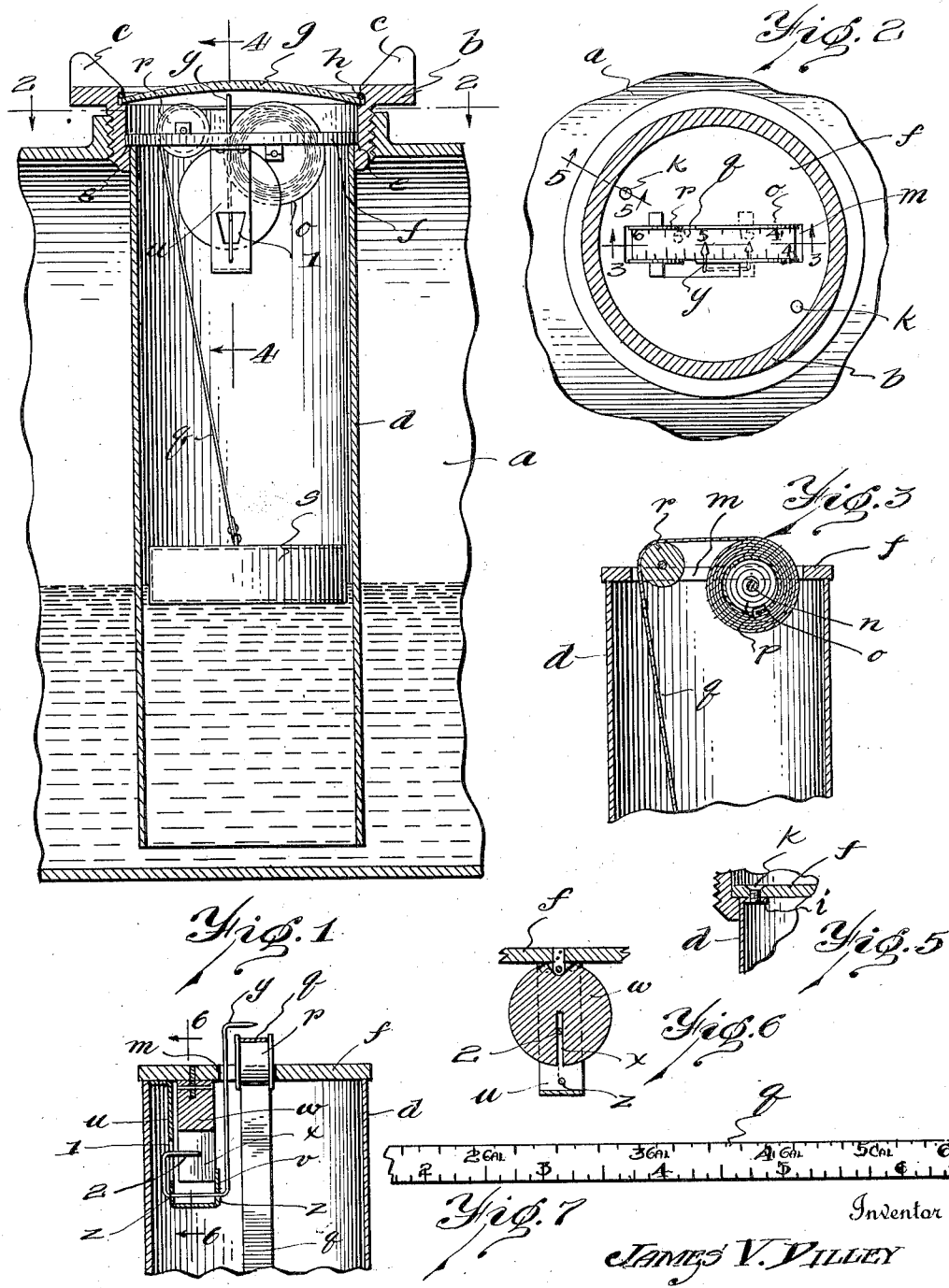

1,557,568

UNITED STATES PATENT OFFICE.

JAMES V. DILLEY, OF DETROIT, MICHIGAN.

GASOLINE GAUGE.

Application filed October 14, 1922. Serial No. 594,468.

*To all whom it may concern:*

Be it known that I, JAMES V. DILLEY, citizen of the United States, residing at Detroit, in the county of Wayne and State of Michigan, have invented certain new and useful Improvements in Gasoline Gauges, of which the following is a specification.

This invention relates to a gasoline gauge the object of which is to give a corrected reading of the fuel level in the tank when the car is tilted, i. e., when one side of the car is lower than the other side which causes the tank to be lower at one end than at the other.

Different conditions arise due to the construction or shape of the tank and to the location of the gauge. The method generally in use today is to have a gauge located in the center portion of the tank which will give fairly accurate readings but only on a square tank. But the square tank is not universally used and on most cars the tank is round or oval in cross-section. When the fuel tank is tilted, the liquid of course will be higher at one end of the tank than at the other end.

First consider a square tank of a 10 gal. capacity for example, assume that one end is lower than the other end. The level at the center will remain the same between the limits approximately of 1½ gal. to 8½ gal. or until the liquid level touches the bottom or top of the tank at one end. An ordinary gauge, consisting of a float attached to an indicator, positioned in the center of the tank, will therefore give an accurate reading between the limits of 1½ gal. to 8½ gal. But if the ordinary gauge were placed at either end it would be inaccurate because the liquid level does not remain the same at the ends of the tank when tilted.

In the round or oval tanks there is only one time when the level does not change in the center when the tank is tilted and that is when the tank contains exactly five gallons or is half full. At all other levels, a change in level at the center takes place when the tank is tilted thus resulting in an inaccurate reading on the gauge. At the ends the level changes similarly as in a square tank, but it is not a constant change due to the round or oval shape of the tank.

The object of this invention is to correct this error, and is especially adapted for use on a round or oval tank but it will work equally well on a square tank. Besides, applicant's gauge can be located at or near the ends of the tank and can accurately measure the contents when the car is tilted. The almost universal practice of carrying a spare wheel and tire on the rear makes it difficult to read a gauge located in the center, and especially so when the car is equipped with wire or disc wheels. It is preferable therefore to locate the gauge at one end of the tank. Practically the only time when one reads the gauge is when the car is drawn up to the curb at a filling station and due to the slope of the street one side of the car is lower than the other and a gauge near the end of the tank will show a considerable error. The present invention therefore has a more universal use and as will appear from the following specification, the error is rectified accurately in some cases and in other cases the error is approximately corrected. In general a more accurate reading at all times is obtainable with this invention.

In the drawings:

Fig. 1 is a vertical section through a fuel tank showing the level indicating means in elevation.

Fig. 2 is a section on the line 2—2 of Fig. 1.

Fig. 3 is a section on the line 3—3 of Fig. 2.

Fig. 4 is a section on the line 4—4 of Fig. 1.

Fig. 5 is a section on the line 5—5 of Fig. 2 showing how the bearing plate is secured to the gauge container.

Fig. 6 is a section on the line 6—6 of Fig. 5.

Fig. 7 is a plan of a portion of the tape used in a round or oval tank.

A fuel tank $a$ which can be either square, round or oval in cross section is provided near one end with an opening in the top, and threaded into this opening is a cap $b$ carrying a pair of wings $c$ for screwing the gauge in place. A sleeve or casing $d$ which is open at its lower end is pressed into the cap $c$ and projects downwardly into the fuel tank to near the bottom. The cap has shoulders $e$ on which a bearing plate $f$ rests. A glass $g$ is secured in the top of the cap similarly to the way a lens is secured in a headlight and held in place by a spring wire ring $h$. The casing $d$ carries a pair of lips $i$ (see Fig. 5) to which the bearing plate $f$ is secured by means of screws $k$.

The bearing plate $f$ is provided with an opening or slot $m$. Supported on the underside of the bearing plate is a stationary shaft $n$ rotatably supporting a take up roller $o$ which projects thru the slot $m$ and is provided with the usual take up spring $p$ one end of which is secured to the stationary shaft and the other end to the roller. A tape $q$ is secured at one end to the roller and passes over an idler roller $r$ which projects thru the slot $m$, and thence downwardly through said slot $m$ into the casing $d$ and a float $s$ is secured to the other end of the tape. When the fuel lever is lowered, the weight of the float is sufficient to unwind the roller and when the fuel level is raised the take up roller takes up the slack in the tape.

A bracket $u$ is secured to the underside of the bearing plate and its lower end is bent in the form of a U forming a retaining member $v$. A weight $w$ is pivotally supported from the bearing plate being suspended within this U bracket and is provided with a slot $x$. An error rectifier pointer $y$ has its index end positioned over the tape and it projects down thru the slot $m$ and is pivoted on the bracket $u$ by passing thru holes $z$ in the lower portion of the bracket $u$. It is then bent up and projects inwardly again thru an enlarged opening $l$ in the bracket and end portion 2 enters the slot $x$ in the weight.

When the tank is tipped to one side or the other the pivoted pointer $y$ will rock due to the relative movement of the weight which is in reality a plumb bob, and the more the tank is tipped the further the pointer $y$ will move to one side or the other.

The tape is calibrated to read in gallons and in Fig. 7 a tape calibrated for a round or oval tank is shown. This tape can have the linear scale in inches marked thereon on one edge and the calibrated capacity scale in gallons on the other edge. In a round or oval tank the markings are closer together in the neighborhood of 5 gal. in a 10 gal. tank, or in other words, at the half capacity markings; in a square tank the variation between the gallons will be constant.

In the operation of this invention the tank is tilted, and let us for example assume that it is tilted in such a way that the end where the gauge is located is lower than the other end, which will cause the fuel lever at that end to be higher than when the tank was not tilted. The float will rise and the tape will wind up on the take-up roller, so referring to Fig. 2, the tape will move to the right which would normally indicate that one has more gasoline in his tank than really exists. But when the tank is tilted the error rectifier comes into play and the pointer $y$ will also move to the right from its normal position. This error rectifier can be so adjusted by means of the positioning of extended portion 2 of the pointer $y$ in the slot $x$ in the weight that it will move the correct distance thereby correcting the error and giving an exact reading. The correct reading is noted by the pointer.

In a square tank this error remains constant for certain angles of inclination of the tank between the limits of 1½ gal. to 8½ gal. and an accurate correction of the error can be made. In a round or oval tank the error due to certain inclinations of the tank does not remain constant. The error rectifier is adjusted to read correctly when half full. The pointer $y$ will always move the same distance for the same inclination of the tank no matter what the level of the fuel in the tank. Now when the level of the fuel in the tank is around 2 or 3 or 7 or 8 gallons as indicated on the tape, and the tank is tilted to such an inclination that an error is present in the reading of the tape, the tape will move further than it did when half full with the same error present. As the travel of the error rectifier remains constant, it is obvious that the error will only be partially corrected. At the extreme limits of ½ gallons and 9½ gallons the tape will move about twice as far as the pointer $y$. With a slight inclination this error is small and the error rectifier cuts it into half at the extreme limits. In between the extreme llimits, the rectifier approximates a correct reading. It is no doubt obvious that an approximate correction is better than none and under most conditions a fairly accurate reading can be made, in a square tank between 1½ and 8½ gallons and in a round or oval tank when approximately half full an exact reading can be made. It is thus seen that this invention will accurately correct the reading under some conditions and will measure with only a slight error a good portion of the time and only at the extreme limits under extreme conditions will the device not read accurately the fuel level or only about 5% of the time. Even under extreme conditions the error is half eliminated so a more accurate reading of the fuel level is obtained under all conditions.

What I claim is:

1. The combination with a liquid fuel tank of fuel-controlled means for indicating the fuel level in the tank, said means normally giving an erroneous indication when the tank is tilted in one plane, and gravity-controlled means co-operating with said first-named means for automatically rectifying the indications thereof when the tank is tilted as specified.

2. The combination with a liquid fuel tank of a bearing member mounted thereon, an indicating tape, a float to rest on the fuel and attached to one end of the tape, a roller carried by the bearing member and to which the other end of the tape is attached, means whereby the roller is actuated to take up slack in the tape, a pointer pivotally supported by the bearing member so as to swing along the tape and gravity controlled means for so positioning the pointer with reference to the tape that the pointer will indicate on the tape the correct reading of the fuel level despite the inclination of the tank in the plane of movement of the pointer.

3. The combination with a liquid fuel tank, of fuel-controlled means for measuring the fuel level in the tank, said means including a movable indicating member, a pivotally-supported error-rectifying pointer co-operating with the indicating member, and gravity-controlled means for so positioning the pointer that it will point to the correct reading of the indicating means despite inclination of the tank in the plane of movement of the pointer.

4. The combination with a liquid fuel tank of movable fuel-level indicating means carried by the tank, fuel controlled means for actuating the indicating means, a pivoted error-rectifying pointer adapted for co-operation with the fuel-level indicating means, a plumb-bob weight pivotally suspended in the tank and so connected with the pointer as to move the latter with reference to the indicating means when the tank is inclined in the plane of movement of the pointer that the pointer will be caused to indicate on said means the correct reading of the fuel level despite the inclination of the tank.

In testimony whereof I affix my signature.

JAMES V. DILLEY.